US006983562B2

(12) United States Patent
Sanderson

(10) Patent No.: US 6,983,562 B2
(45) Date of Patent: Jan. 10, 2006

(54) METHOD AND APPARATUS FOR THE HYDROPONIC CULTIVATION OF PLANTS

(75) Inventor: Ashley Craig Sanderson, Woodacre, CA (US)

(73) Assignee: Ashley Sanderson, Woodacre, CA (US)

( * ) Notice: Subject to any disclaimer, the term of this patent is extended or adjusted under 35 U.S.C. 154(b) by 72 days.

(21) Appl. No.: 10/829,836

(22) Filed: Apr. 21, 2004

(65) Prior Publication Data

US 2005/0011124 A1 Jan. 20, 2005

Related U.S. Application Data

(60) Provisional application No. 60/487,704, filed on Jul. 16, 2003.

(51) Int. Cl.
*A01G 31/00* (2006.01)
(52) U.S. Cl. .................................. 47/62 R
(58) Field of Classification Search .............. 47/62 R; 406/36; 417/56, 109
See application file for complete search history.

(56) References Cited

U.S. PATENT DOCUMENTS

| | | | | |
|---|---|---|---|---|
| 1,333,279 A | * | 3/1920 | Rigling | ...................... 417/109 |
| 2,306,027 A | * | 12/1942 | Swaney | ........................... 47/79 |
| 4,676,023 A | | 6/1987 | Mori | |
| 5,299,383 A | * | 4/1994 | Takakura et al. | ......... 47/58.1 R |
| 5,557,885 A | | 9/1996 | Sledge | |
| 5,727,908 A | * | 3/1998 | Ward | ........................... 406/36 |
| 6,162,020 A | * | 12/2000 | Kondo | ......................... 417/54 |

FOREIGN PATENT DOCUMENTS

| | | | |
|---|---|---|---|
| GB | 2241860 A | * | 9/1991 |
| JP | 407310698 A | * | 11/1995 |
| JP | 411159500 A | * | 6/1999 |

* cited by examiner

*Primary Examiner*—Francis T. Palo

(57) ABSTRACT

A device for the delivery of nutrient solution to plants, comprised of an air-lift pump and a vessel which surrounds a portion of the air-lift pump. The vessel is of adequate size and shape to contain a supply of nutrient solution for operation of the air-lift pump. The vessel is replenished with nutrient solution from another, larger source of nutrient solution (external reservoir) with tubing, pipe, or other means of fluid communication. This device allows an air-lift pump to be supplied with nutrient solution, while attenuating plant roots, growing media, and other matter, thereby increasing air-lift pump reliability. Also, this device makes possible the operation of air-lift pumps at a variety of locations relative to a nutrient solution reservoir.

4 Claims, 2 Drawing Sheets

METHOD AND APPARATUS FOR THE HYDROPONIC CULTIVATION OF PLANTS

CROSS-REFERENCE TO RELATED APPLICATIONS

This application claims the benefit of PPA Ser. No. 60/487,704, filed Jul. 16, 2003 by the present inventor.

FEDERALLY SPONSORED RESEARCH

Not Applicable

SEQUENCE LISTING OR PROGRAM

Not Applicable

BACKGROUND OF INVENTION

1. Field of Invention

This invention relates to hydroponic systems, specifically to an improved method and apparatus for the delivery of nutrient solution to plants.

2. Background of the Invention

Hydroponic systems are designed to apply nutrient solution to plants at a controlled and predictable rate over time. Air-lift pumps, or water pumps driven by compressed air have been used in hydroponic systems before, but in configurations that have made them impractical and unreliable. Air-lift pumps have characteristics beneficial to their use in hydroponic systems. For example, air-lift pumps aerate nutrient solution and deliver nutrient solution to plants simultaneously, favorably contributing to the efficiency and performance of a hydroponic system. Also, an air-lift pump has no moving parts, and is therefore very reliable when used in an operating environment free of objects or accumulations that may clog the pump. Despite this, previous hydroponic systems using air-lift pumps have suffered from many disadvantages, including low reliability, accessibility, viewability, poor performance, high maintenance requirements, and difficulty expanding system size to accommodate many air-lift pumps over a large area.

U.S. Pat. No. 4,676,023 presents a hydroponic system that uses one air-lift pump placed in a nutrient reservoir to deliver hydroponic nutrient to a trough holding a number of plants. This design has a number of real and potential shortcomings. The number of plants that can be grown using this system is limited in that air-lift pumps do not move fluid well across horizontal distances, therefore any application of hydroponic nutrient must be located close to the nutrient reservoir. Another disadvantage of this system is that the plants do not receive freshly air-lifted and oxygenated nutrient over the tops of their roots, but instead gather nutrient from the bottom of the channels in which they sit, thereby lessening oxygen available to the plants' roots, and limiting growth.

U.S. Pat. No. 5,557,885 discloses a method using air-lift pumps. This hydroponic system uses individual "planters", each composed of two receptacles, or tubs, one of a shorter height than its counterpart. The shorter tub is placed on and into the top of the taller tub. Rocks or other growing media are placed in the upper tub. An air-lift pump is placed vertically within both tubs, sitting within the growing media, through a hole cut in the bottom of the upper tub, and in the space created between the bottoms of the two tubs. This space between the bottoms of the two tubs then, acts as a nutrient reservoir for the air-lift pump. Compressed air is supplied to the air-lift pump and nutrient solution circulates to the top of the growing media, down through the growing media, through holes in the bottom of the upper tub, and back into the reservoir. This system suffers from a number of disadvantages:

(a) The placement of the air-lift pump within each planter makes it vulnerable to clogging from plant roots and debris, making the system unreliable. Organic matter and plant roots grow down through the holes in the bottom of the upper tub, and into the air-lift intake, rendering it inoperable.

(b) There is no practical way to see if debris and organic matter are invading the air-lift pump. The air-lift pump is hidden within the planter unit.

(c) The air-lift pump is not easily accessible should it need to be cleaned, unclogged, or inspected.

(d) The nutrient reservoir formed by this planter cannot hold a large quantity of nutrient solution, and may therefore require frequent replacement, especially when used with fast growing plants.

(e) This system does not automatically maintain a constant nutrient solution level within the planter. As nutrient solution is used up, the nutrient solution level within the planter lowers, creating a number of undesirable conditions. Firstly, the performance of an air-lift pump largely depends on the pump being surrounded with fluid at an optimal, predetermined level. Because the level of nutrient solution in this system changes constantly as it is used up, so too the air-lift pump performance changes accordingly. Additionally, as the nutrient solution level decreases, the salinity and Ph value of the remaining nutrient solution quickly changes, compromising plant health and growth.

(f) There is no means of connecting these planters to external reservoirs.

Hydroponic systems using air-lift pumps are sold today in retail stores under various brand names such as "Water-Farm" and "PowerGrower". These planters are very similar to U.S. Pat. No. 5,557,885 with a few differences. The shape and size of these planters are usually shorter and wider than said patent. Also, the air pumps are located outside the planter tubs. Finally, in each of these planters, a hose is connected to the base of the lower tub, which allows the planter to be connected to an external reservoir. Although each planter can be connected to a larger, external reservoir to replenish used nutrient and maintain a constant water level, these planters do not, and cannot be made to recirculate nutrient solution between themselves and the external reservoir. Theese planters instead, are merely "topped up" by the external reservoir, as the plants transpire the water in the nutrient solution. As a result, the relatively small quantity of nutrient solution contained in each planter unit quickly degenerates in quality. The only way to maintain nutrient solution quality with this system is to drain and replace the nutrient solution often, thereby contributing to high maintenance requirements. Additionally, these systems suffer many of the same shortcomings as U.S. Pat. No. 5,557,885 such as a vulnerability of the air-lift pump to clogging, and a lack of viewability of the air-lift pump.

BACKGROUND OF INVENTION—OBJECTS AND ADVANTAGES (a) To provide a method of using air-lift pumps in hydroponic systems which allows air-lift pumps to be supplied with nutrient solution in an operating environment relatively free of plant roots, or other solid matter that could otherwise quickly clog the air-lift pump.

(b) To provide a method of using air-lift pumps in hydroponic systems which facilitates the connection of multiple air-lift pumps to an external nutrient reservoir.

(c) To provide a method of using air-lift pumps in hydroponic systems which allows continuous recirculation of nutrient solution between an air-lift pump and an external reservoir if desired.

(d) To provide a method of using air-lift pumps in hydroponic systems which allows easy removal of the air-lift pump from its operating location for purposes including cleaning and inspection.

(e) To provide a method of using air-lift pumps in hydroponic systems which may be configured to allow viewability of the air-lift pump and the air-lift pump's operating environment, while the air-lift pump is in operation.

SUMMARY

Accordingly, the invention is a hydroponic device for the application of nutrient solution to plants that includes an air-lift pump and related components that supply nutrient solution through the air-lift to plants, and that provide a number of substantive advantages.

Firstly, a vessel is configured and sized to surround a portion of the air-lift pump for containing a volume of nutrient solution to allow air-lift pump operation.

Means are provided for fluid communication between the vessel and a nutrient supply source. This connection between the vessel and its nutrient supply source, by distance or configuration, is such that plant roots, growing media, or other large debris that could quickly clog the air-lift pump, are restricted from entering the vessel. Tubing or pipe, for example, could be used to connect the vessel to a nutrient supply source, with enough distance between them to restrict the entry of plant roots and unwanted solid matter into the vessel. The vessel could also be located adjacent to a nutrient reservoir, and connected to the reservoir through an orifice that is shaped, filtered, or otherwise configured to allow the flow of nutrient solution yet attenuate the entry of roots and other solid matter that could otherwise clog the air-lift pump.

The invention also provides means for easy removal and reinstallation of the air-lift pump from the vessel. The vessel and air-lift pump are constructed in a shape that allows the air-lift pump to rest within the vessel at a correct operating position, and can be easily accessed by lifting the air-lift pump from the vessel. As an example, a stopper can be constructed around the air-lift pump such that, when placed inside the vessel, the stopper secures the air-lift pump at a correct operating position within the vessel. This assembly of air-lift pump and stopper could easily be removed from, and reinserted into, the vessel, for purposes including cleaning and inspection.

DRAWINGS—FIGURES

DRAWINGS—DETAILED DESCRIPTION

Figure 1:
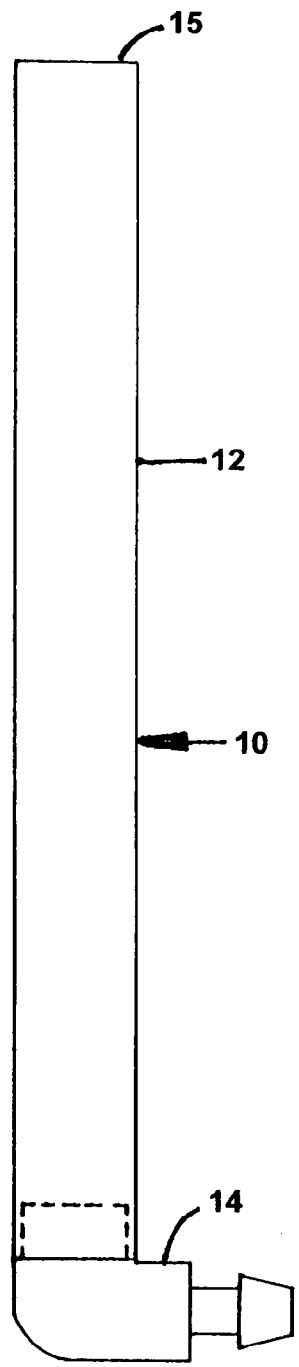
FIG. 1 shows a side elevational view of a nutrient solution-containing vessel constructed in accordance with the present invention.
Figure 2:
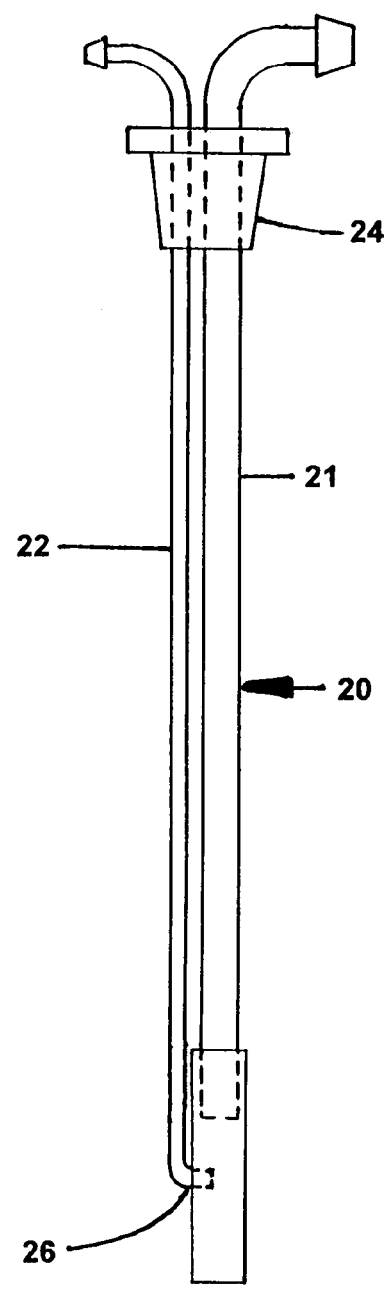
FIG. 2 shows a side elevational view of an assembly including an air-lift pump constructed in accordance with the present invention.

FIG. 1 and FIG. 2 together show an embodiment of the present invention in its separable and separated parts.

FIG. 1 shows a vessel for the containing of nutrient solution, and related components generally at 10. Vessel 10 may be constructed from any of a variety of materials, and in many possible shapes and configurations. The embodiment here includes a nutrient solution-containing cylinder 12. Means for connecting cylinder 12 to a nutrient supply reservoir is shown in this example as a barbed hose connector 14. At the top of cylinder 12 is an opening 15 through which air-lift assembly 20 may be inserted and removed.

FIG. 2 shows an assembly including an air-lift pump generally at 20. The components comprising the air-lift pump in the present invention are typical to air-lift pumps in general, and should be familiar to one skilled in the art. These air-lift components include an air inlet pipe 22, air injection port 26, and water riser pipe 21. In this embodiment of the present invention, a stopper 24 is constructed around the air-lift components, and is sized and configured to be placed into cylinder 12 at opening 15. It should be understood, however, that a stopper is one possible way of providing means for easy removal and installation of the air-lift pump from the vessel, and that other configurations could be used.

Figure 3:
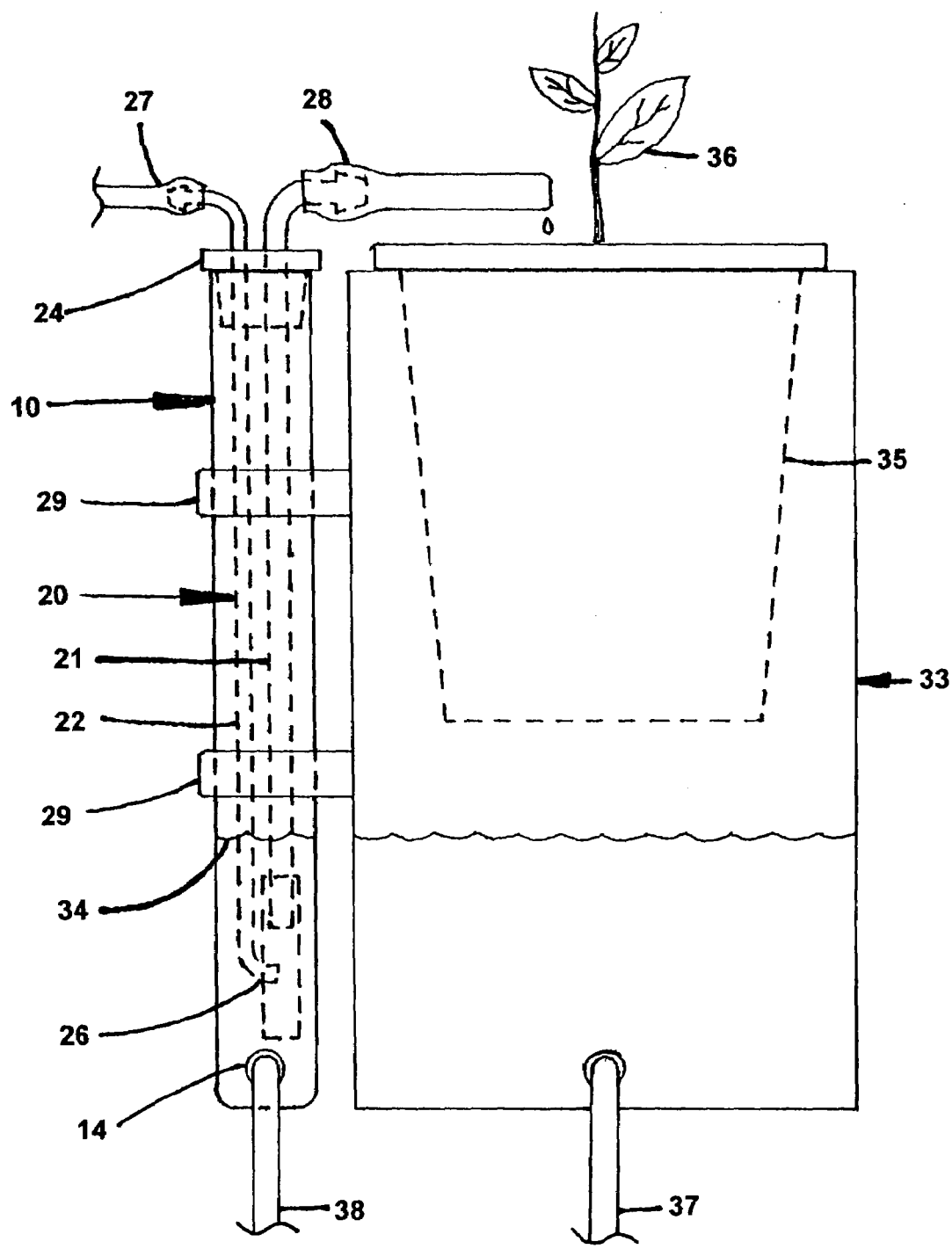
FIG. 3 shows a side elevational view of an embodiment of the present invention in position relative to a hydroponic planter.

FIG. 3 shows the present invention in an assembled condition and positioned next to a hydroponic planter for operation. The operational effect of the present invention, as described hereinafter, is that, by using the vessel and related components to contain nutrient solution for delivery to the air-lift pump, the invention supplies the air-lift pump nutrient solution for operation, and simultaneously acts to restrict material that could quickly clog the air-lift pump from entering the vessel, thereby significantly increasing reliability of the air-lift pump. The invention also allows flexibility of hydroponic system design by allowing one or a plurality of air-lift pumps to be placed in many possible locations relative to a nutrient supply source.

In FIG. 3 clips 29 are used to fasten vessel 10 in position adjacent to a hydroponic planter 33. Air-lift pump assembly 20 is mounted within vessel 10 and fixed in position by stopper 24. A section of tubing 28 is attached to water riser pipe 21 and positioned for application of nutrient solution to planter 33, the growing media in pot 35, and to plant 36. A separately located air pump, required to power the air-lift pump, is connected to air inlet pipe 22 with tubing 27.

Means for fluid communication between the present invention and a separately located nutrient supply reservoir is provided by a connector 14 and tube 38. In the particular embodiment shown, a quantity of tubing is provided to create distance between vessel and nutrient supply source sufficient to prevent plant roots from growing into the vessel, and sufficient to attenuate the entry of solid material into the vessel that would otherwise be capable of quickly clogging the air-lift pump. It should be noted that alternate embodiments could be envisioned in which the vessel is located adjacent to a nutrient supply source and protected from unwanted material with the use of a screen, filter, specifically shaped orifice, or other such method. Means for fluid communication between hydroponic planter 33 and the nutrient supply reservoir is provided by tube 37.

Operation of the Invention

In actual use, the vessel and related components 10 are located adjacent to where the application of nutrient solution is desired. In the embodiment shown, vessel 10 is located adjacent to hydroponic planter 33 with clips 29. Vessel 10 is supplied with nutrient solution by attaching connector 14 to one end of tube 38, and attaching the other end of tube 38 to a remotely located nutrient solution reservoir. The length of tubing 38 is sufficient to restrict the entry of matter, that could otherwise quickly clog the air-lift pump. If this distance between vessel 10 and the nutrient reservoir is insufficient to adequately restrict the entry of unwanted solid matter into the vessel, or if more protection from debris is desired, further methods may be used., such as constructing a filter or orifice specifically shaped to attenuate the flow of solid matter, between the vessel and nutrient reservoir.

The level of nutrient solution in vessel 10 will naturally equal the level of nutrient solution in the remotely located reservoir, and so by maintaining a constant and predetermined level of nutrient solution in the reservoir, a level of nutrient solution ideal for air-lift pump operation can be maintained in the vessel.

Air-lift pump assembly 20 is placed within vessel 10 and held in position for operation by stopper 24. The air-lift pump is supplied with compressed air by a remotely located air pump through tube 27. This compressed air travels from the air pump, through tube 27, down air inlet pipe 22, and through air injection port 26. The air then bubbles up water riser pipe 21, pumping nutrient solution up the water riser tube, through tube 28 to the planter 33 and plant 36.

As nutrient solution is pumped out of vessel 10, it is replenished by a remotely located nutrient solution reservoir through tube 38, and thereby maintained at predetermined level 26. After being applied to planter 33, the nutrient solution then flows back to the nutrient reservoir through tube 37. With the present invention configured in this way, a constant recirculation of nutrient solution between the planter and nutrient reservoir is achieved.

The air-lift pump assembly 20 may be removed from vessel 10 by grasping stopper 24 and lifting the assembly from the vessel. Once removed, the assembly may be inspected or cleaned of accumulated matter, further contributing to system reliability.

Alternative Embodiments

In addition to the obvious benefit of increased system reliability, the present invention can provide a number of additional advantages, depending on how the invention is configured.

In the embodiment shown, clips 29 are used to secure the vessel 10 to planter 33, and adjacent to plant 36. With the use of clips and flexible tubing, as in this example, the vessel may be moved and relocated to many possible locations allowing much flexibility of system design. This is merely one possible embodiment of this invention. However, there are many more possibilities. For example, instead of flexible tubing, the vessel could be connected to a nutrient supply source with the use of rigid pipe. One could also locate the vessel directly adjacent to, or construct it as an integral part of a nutrient supply reservoir. A filtered or specifically shaped orifice constructed in between would allow fluid communication and simultaneously restrict the entry of solid matter into the vessel. In another embodiment, the invention could conceivably be constructed integrally as a part of a hydroponic planter, using the planter itself as a nutrient supply reservoir. Yet another use would involve the use of multiple air-lift pumps in one vessel, thus increasing the number of possible nutrient application locations.

If desired, the vessel may be constructed of a transparent material so that the operation of the air-lift pump can be monitored while in use. By using a colored, transparent material, ideally blue or green, the unwanted growth of algae within the vessel can be prevented, while still allowing viewability of the air-lift pump.

I claim:

1. An apparatus for the delivery of hydroponic nutrient solution to plants, said apparatus comprising;

An air lift pump;

A vessel configured and sized to surround a portion of said air lift pump, said vessel further configured as an integral part of another component of a hydroponic system, whereas said vessel integrally and simultaneously comprises another component of a hydroponic system, said vessel configured and sized to contain a volume of nutrient solution for operation of said air-lift pump;

Means for fluid communication between a lower end of said vessel and a nutrient supply source, said nutrient supply source comprising a volume of nutrient solution larger than contained in said vessel, and Means for removal of said air-lift pump from said vessel whereas said air-lift pump may easily be lifted and removed from said vessel.

2. An apparatus of claim 1 wherein a plurality of air-lift pumps are contained within said vessel.

3. An apparatus of claim 1 wherein said vessel communicates with a plurality of nutrient supply reservoirs.

4. An apparatus of claim 1 wherein said vessel is constructed of a transparent, colored material such as acrylic for the purpose of allowing viewability of air-lift pump operation, while inhibiting algae growth within said vessel.

* * * * *